UNITED STATES PATENT OFFICE.

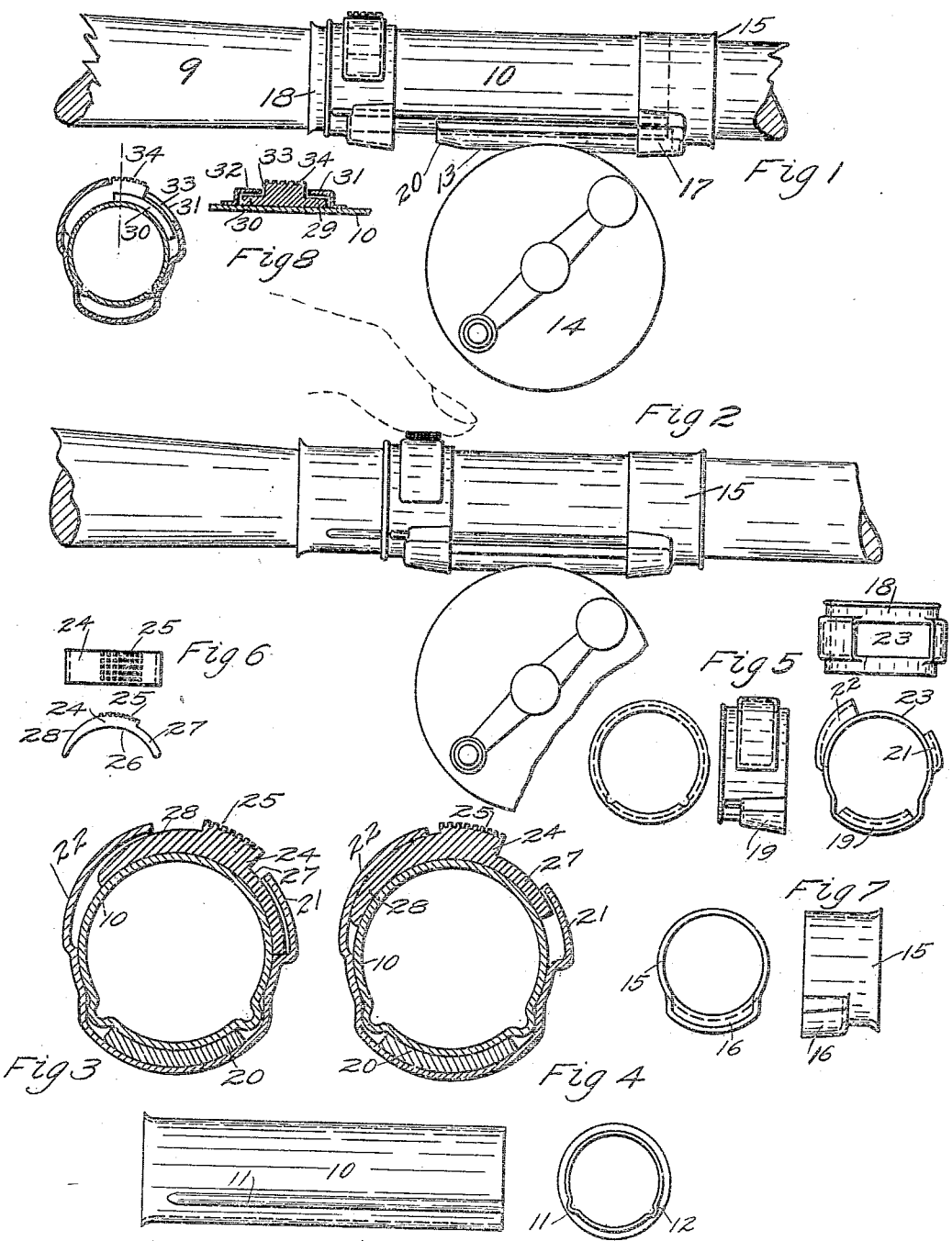

FRANCIS F. BECRAFT, OF UTICA, NEW YORK.

MEANS FOR CLAMPING REELS ON FISHING-RODS.

953,775.

Specification of Letters Patent. Patented Apr. 5, 1910.

Application filed April 30, 1909. Serial No. 493,141.

*To all whom it may concern:*

Be it known that I, FRANCIS F. BECRAFT, a citizen of the United States, residing in Utica, in the county of Oneida and State of New York, have invented certain new and useful Improvements in Means for Clamping Reels on Fishing-Rods, of which the following is a specification.

This invention has reference to means for retaining, at will, upon a fishing rod, the reel upon which to wind the fishing line.

One of the objects of the invention is to provide a practical, efficient, simple and durable clamp for retaining in place, a collar which holds the reel-base in place, and to simplify the construction and operation of that clamp — depending somewhat on the flexibility of the material from which the collar will be created, to enhance the efficiency of the clamping member.

So long as the essence of the invention is kept in view, various mechanical assemblages may be adopted, and it is to one of these assemblages that this description will relate, and the accompanying sheet of drawings will illustrate.

On this drawing Figure 1, illustrates a fragment of a fishing-rod, a sleeve mounted thereon, upon which a reel is seated, and a clamp-collar by which the reel may be affixed to its seat—the invention being illustrated, however, remote from the reel-base. Fig. 2, similar in all respects to Fig. 1, illustrates the clamp-collar in engagement with the reel-base. Fig. 3, illustrates, in exaggeration, a cross-sectional view of an embodiment of the invention—the clamp—the clamping element thereof being released from action. Fig. 4 illustrates a reversed position of the clamping member or the wedge of the clamp. Fig. 5, comprehends a group of the essential elements of the reel-base-retainer and how they may be formed. Fig. 6, illustrates a form of wedge employed in the clamp. Fig. 7, illustrates two views of a collar suitably designed to hold the reel-base. Fig. 8 illustrates a modified form of the invention, and Fig. 9 illustrates two views of a sleeve.

Confining the description of the invention to the illustrated form, which may be said to represent only one into which the invention may be embodied, there is mounted upon a fishing-rod 9, a sleeve 10, along which, and in parallelism, may be formed or located a pair of ribs 11 and 12, between which, and upon the body of the sleeve 10, may be located, against lateral suasion, a reel-base 13, upon which may be supported the usual reel 14.

At or near one of the extremities of the sleeve 10 is a collar 15, which may be provided with a hood 16 to receive a toe 17 of a reel-base 13, which may, as is so generally in practice, be so tapered that persistent introduction thereof into said hood 16 will create friction engagement between said toe and hood. Slidably mounted upon said sleeve 10, and preferably guided by the ribs 11 and 12, forming the reel-base-seat, is another collar 18, having also a hood 19 adapted to receive an oppositely extended toe 20 of the reel-base 13. This collar 18 differs from the collar 15 in that the latter is provided with two hoods 21 and 22 separated by an opening 23. These hoods may be formed upon or integral with the collar 18 in any suitable manner, preferably, in practice, by striking up the same from the body of the collar.

Slidably mounted upon the body of the sleeve 10, is a wedge or shoe 24, having a thumb-piece 25 which protrudes from the opening 23, and this member 24, is provided with a concentric face 26, which conforms to the contour of the body of the sleeve 10. For a distance, and to one side of the thumb-part 25, is a heel 27 which is adapted to play in the hood 21—the latter, with a portion of the sleeve 10, serving as a guide for said heel 27.

The toe 28 of the shoe 24 tapers from the thumb-part 25, being reduced in progression, and this toe occupies the hood 22, on the collar 18, which is so formed as to create, with a portion of the sleeve 10, a tapered chamber, corresponding somewhat in shape to the toe 28 of the shoe 24. It follows, therefore, that when the position of the shoe as shown in Fig. 3 is changed to that shown in Fig. 4 with the movement of the same in coincidence with the body of the sleeve, the wedge-like toe 28, will bind upon the underside of the hood 22, and create sufficient friction between the toe 28 and hood 22 and the face of the shoe and sleeve 10, to lock the collar 18 to the sleeve 10, against movement thereon. The character of the hood 22 is such, that upon persistent forcement of the toe 18 of the shoe thereunder, the same will sufficiently flex to arrest the shoe in frictional engagement with the hood 22 and the body of the sleeve 10. And it may be here stated, that in practice, this hood 22 will so be formed as to give only such play between the surfaces of the hood 22 and toe 28, as will permit of the necessary free movement when the shoe is shifted out of frictional engagement with the hood 22. By this means, it is possible to prevent the introduction into the hood 22, of such substances as may but ordinarily affect or retard the practical operation of the shoe. It is well to note also that in shifting the shoe into place for locking action, the pressure of the free end of the hood 22 will be so applied substantially intermediate of the shoe's length, as to distribute the pressure throughout the contact surfaces of the shoe 24 and sleeve 10. Thus it will be seen, that after the collar 18 has been shifted in place along the sleeve 10, to take hold upon the toe 20, of the reel-base 13, the wedge or shoe carried in the housings of that collar may be shifted to lock the collar against further movement at will, and again shifted to likewise release the collar from its arrested position. It will be also noted particularly that the sleeve for locking action depends somewhat entirely upon the friction which can be set up between it and the collar 18 and therefore this collar can be shifted to any point along the sleeve 10, and locked to it with equal results. It may also be observed that the clamping collar may be applied in various ways upon the sleeve without impairing the clamping efficiency of the device.

By reference to Fig. 8, it will be observed that the body of the shoe 24 is provided with flanges 29 and 30 which are incased in guides 31 and 32 formed upon the collar 18. The opening 33 created in and by the guides serves to accommodate the thumb-part 34 of the wedge.

Having thus described an embodiment of this invention, I desire to secure by Letters-Patent the protection of the following invention:

A clamping device for holding a reel base upon a fishing rod, comprising a sleeve having a shoe face, a movable shoe adapted to engage with said face, a collar slidable along said sleeve, and having a wall concentrically disposed relatively to said shoe-face, a housing carried by said collar having a curved wall eccentrically disposed relatively to the wall of the collar, and means for shifting the shoe and collar relatively whereby both may frictionally engage each other and the sleeve.

In testimony whereof I have this 22nd day of April, in the year of our Lord, 1909, set my hand, in the presence of two witnesses, in the office of my patent attorney, Fred. W. Barnaclo, at Utica, Oneida county, New York.

FRANCIS F. BECRAFT.

Witnesses:
 FRED. W. BARNACLO,
 HUGH T. HUGHES.